United States Patent [19]
Ohtsuki et al.

[11] Patent Number: 5,620,263
[45] Date of Patent: Apr. 15, 1997

[54] AXLE BEARING ASSEMBLY AND METHOD OF MEASURING BEARING CLEARANCES

[75] Inventors: Hisashi Ohtsuki, Iwata-gun; Motoharu Niki, Iwata; Yasunori Terada, Iwata; Nobuyoshi Yamashita, Iwata, all of Japan

[73] Assignee: NTN Corporation, Osaka, Japan

[21] Appl. No.: 448,328

[22] PCT Filed: Oct. 28, 1994

[86] PCT No.: PCT/JP94/01830

§ 371 Date: Jul. 18, 1995

§ 102(e) Date: Jul. 18, 1995

[87] PCT Pub. No.: WO95/12072

PCT Pub. Date: May 4, 1995

[30] Foreign Application Priority Data

Oct. 28, 1993 [JP] Japan ................................. 5-269362
Oct. 29, 1993 [JP] Japan ................................. 5-271479

[51] Int. Cl.$^6$ ............................. F16C 33/60; F16C 43/04
[52] U.S. Cl. ...................... 384/517; 29/898.09; 384/500; 384/537
[58] Field of Search ........................... 384/450, 499, 384/500–502, 504–506, 512, 517, 519, 537, 543, 544, 563; 73/593, 862.49, 862.59; 33/517, 701, 710, 37

[56] References Cited

U.S. PATENT DOCUMENTS

| | | | |
|---|---|---|---|
| 3,056,636 | 10/1962 | Mims | 384/517 |
| 4,150,468 | 4/1979 | Harbottle | 29/898.09 |
| 4,172,621 | 10/1979 | Yoshida | 384/563 |
| 4,336,641 | 6/1982 | Bhatia | 29/898.09 |
| 4,476,614 | 10/1984 | Pittroff | 29/898.09 |
| 4,732,497 | 3/1988 | Sawa et al. | 384/563 X |
| 5,341,569 | 8/1994 | Takamizawa et al. | 29/898.09 |

FOREIGN PATENT DOCUMENTS

| | | | |
|---|---|---|---|
| 121322 | 7/1983 | Japan | 384/512 |
| 235419 | 8/1994 | Japan | 384/517 |

*Primary Examiner*—Thomas R. Hannon
*Attorney, Agent, or Firm*—Nikaido, Marmelstein, Murray & Oram LLP

[57] ABSTRACT

The end surface 2c of the press-fit portion 2c of the axle 2 is machined with high precision to serve as a reference surface for measuring the negative bearing clearance upon completion of the assembly. The inner ring 3 is press-fitted on the press-fit portion 2c of the axle 2 and is fixed in position by the nut 6 screwed on the threaded portion 2d of the axle 2. In this axle bearing assembly, the inner ring 3 abuts against the shoulder portion 2d of the axle 2 with no clearance defined therebetween, and the negative bearing clearance is assured.

4 Claims, 8 Drawing Sheets

AXLE BEARING ASSEMBLY AND METHOD OF MEASURING BEARING CLEARANCES

BACKGROUND OF THE INVENTION

The present invention relates to an axle bearing assembly for supporting a wheel of an automobile, and particularly it relates to an axle bearing assembly used for wheels of the type in which a raceway surface is formed directly on the axle, and to a method of measuring bearing clearances.

As an example, in a conventional axle bearing assembly shown in FIG. 15, the inner periphery of an outer ring 21 is formed with two rows of raceway surfaces 21a and 21b, and a raceway surface 23a opposed to the raceway surface 21b is formed on the outer periphery of an inner ring 23 while a raceway surface 22a opposed to the raceway surface 21a is directly formed on the outer periphery of an axle 22. The outer ring 21 is integrally formed around its outer periphery with a flange 21c to be fixed to the body of an automobile or the like, while the axle 22 is integrally formed around the outer periphery of the end thereof with a flange 22g for mounting a hub bolt 27 thereon. Further, the axle 22 is formed on substantially the central outer periphery thereof with the raceway surface 22a and also with a press-fit portion 22c continuous therewith through a shoulder portion 22b and adapted to have the inner ring 23 press-fitted thereon. The inner ring 23 is press-fitted on the press-fit portion 22c of the axle 22 and fixed in position by a nut 26 screwed on the end of the axle 22.

In this connection, in this kind of bearing assembly, considering the rolling life, rigidity, and fretting of the bearing, the advantageous use of the bearing is with a negative axial bearing clearance, i.e., with a predetermined preload; however, since it is difficult from the viewpoint of controlling the clearance to measure a negative bearing clearance, it has been common practice to predetermine an initial bearing clearance by allowing for a decrease in the bearing clearance by press-fitting the inner ring 23 on the press-fit portion 22c or by tightening by means of the nut 26. That is, the tightening torque to be applied to the nut 26 corresponding to the desired amount of preload is preset, and the inner ring 23 is forced toward the shoulder portion 22b of the axle 22 until the tightening torque on the nut 26 reaches this present value. Accordingly, if such preload (bearing clearance) control means is used, it is essential that upon completion of the press fitting, a spacing W be present between the front face of the inner ring 23 and the shoulder portion 22b of the axle 22.

Generally, in a double row angular contact ball bearing having a pair of inner rings, since the relative position between the pair of inner and outer rings determines the bearing clearance (amount of preload), the bearing clearance (negative bearing clearance) can be measured, e.g., in the manner shown in FIG. 16. That is, with the pair of inner rings 33 held by a shaft member 32 for measurement so as to reduce the axial bearing clearance of the bearing to zero, compressed air X is blown out of the spacing h between the inner rings 33 through an air passage 32a provided in the shaft member 32, and then the spacing h is found from the detected value of the back pressure of the compressed air X or the like; thus, the negative bearing clearance (=h) which is present upon completion of the assembly can be found. However, in a bearing assembly as shown in FIG. 15, since the bearing clearance is determined by the amount of press-fitting of the inner ring 23 on the axle 22, it is impossible to use the above-described measuring method as it is. Herein lies the reason why the indirect clearance control has been made in this kind of bearing by the tightening torque on the nut.

SUMMARY OF THE INVENTION

In a conventional axle bearing assembly, even if the optimum preload (optimum bearing clearance) is determined from the viewpoint of the bearing life and rigidity, there is no means for measuring it, and there is a variation in tightening torque on the nut; therefore, problems on reliability still remain to be solved. Further, since the spacing W is present between the inner ring 23 and the shoulder portion 22b, in operation, the inner ring 23 moves slightly toward the shoulder portion 22b, thus leading to a danger of more preload than necessary being imposed on the bearing.

An object of the invention is to increase the reliability of this type of bearing assembly by providing a construction which assures a negative bearing clearance in an axle bearing assembly as described above and by providing a clearance measuring method.

In order to attain the object described above, the present invention provides an axle bearing assembly characterized in that an inner ring is press-fitted until it abuts against the shoulder portion of the axle and in that the bearing clearance is negative.

Further, the present invention is intended to provide a bearing clearance measuring method comprising, in press-fitting an inner ring on the press-fit portion of an axle, the steps of once stopping the press fitting while the axial bearing clearance is positive, measuring the axial dimension (A) in this state between a reference surface for the axle and a reference surface for the inner ring and a axial bearing clearance ($\Delta a'$) and measuring, upon completion of the press-fitting of the inner ring, the axial dimension (B) between the reference surface for the axle and the reference surface for the inner ring, thereby finding a negative axial bearing clearance ($\Delta a$) present upon completion of the assembly from the formula, $\Delta a = \Delta a' - (A-B)$.

Further, the present invention provides a bearing clearance measuring method comprising, in press-fitting the inner ring on the press-fit portion of the axle, the steps of once stopping the press fitting while the axial bearing clearance is positive, measuring the axial bearing clearance ($\Delta a'$) in this state, and measuring the amount of press-fitting stroke (C) continuing from this state to completion of the press-fitting of the inner ring, thereby finding the negative axial bearing clearance ($\Delta a$) present upon completion of the assembly from the formula, $\Delta a = \Delta a' - C$.

Further, the invention provides a bearing clearance measuring method comprising, in forming the axle with an air passage which opens to the outside in the vicinity of the shoulder portion and press-fitting the inner ring on the press-fit portion of the axle, the steps of once stopping the press fitting while the axial bearing clearance is positive, finding the spacing (S) in this state between the shoulder portion of the axle and the end surface of the inner ring opposed thereto from measured values such as the back pressure and the amount of flow or flow rate of compressed air blown out of the spacing (S) through said air passage, measuring the axial bearing clearance ($\Delta a'$) in this state, and press-fitting the inner ring until it abuts against the shoulder portion of the axle, thereby finding the negative axial bearing clearance ($\Delta a$) from the formula, $\Delta a = \Delta a' - S$.

In the assembling process of bearings, the negative bearing clearance can be reliably measured by once stopping the press fitting of the inner ring while the axial bearing clearance is positive, measuring the axial bearing clearance in this state, measuring the amount of press fitting continuing to completion of the press fitting of the inner ring, and subtracting said amount of press fitting from this bearing clearance.

The amount of press fitting continuing to completion of the press fitting of the inner ring can be found by measuring the axial dimension between the reference surface formed on the axle and the reference surface for the inner ring or by directly measuring the amount of the press-fitting stroke for the inner ring.

Further, in the assembling process of the bearing, the negative bearing clearance can be reliably measured by once stopping the press fitting of the inner ring while the axial bearing clearance is positive, measuring in this state the spacing (S) between the shoulder portion of the axle and the end surface of the inner ring opposed thereto and also measuring the axial bearing clearance, measuring the amount of press fitting (S'=S) continuing to completion of the press fitting of the inner ring, and subtracting said amount of press fitting from this bearing clearance. The measurement of the spacing (S) is made by blowing the compressed air out of the spacing (S) through the air passage formed in the axle, and detecting the back pressure and the amount of flow or flow rate of the compressed air.

According to the invention, since the negative bearing clearance is found by once stopping the press fitting of the inner ring while the axial bearing clearance is positive, measuring the axial bearing clearance in this state and subtracting the amount of press fitting continuing to completion of the press fitting of the inner ring from this bearing clearance, the negative bearing clearance can be accurately and easily measured even if rigid control of the tightening torque is not made.

Further, since the negative bearing clearance is reliably assured, it is possible to increase the initial bearing clearance to thereby decrease the rate of defectiveness.

Further, even in the construction in which the inner ring is pressed against the shoulder portion of the axle, measurement of the negative bearing clearance is possible; therefore, the stable negative bearing clearance can be maintained while avoiding deviation of the inner ring due to its slight vibration.

Further, the bearing clearance can be reliably and easily measured by detecting the back pressure or the amount of flow or flow rate of compressed air blown out of the spacing (S) through the air passage in the axle.

The bearing assembly in which the inner ring is pressed against the shoulder portion of the axle and which assures that the bearing clearance is negative is remarkably high in reliability from the view points of bearing life, rigidity and fretting.

DESCRIPTION OF THE PREFERRED EMBODIMENT

Embodiments of the invention will now be described.

Figure 1:
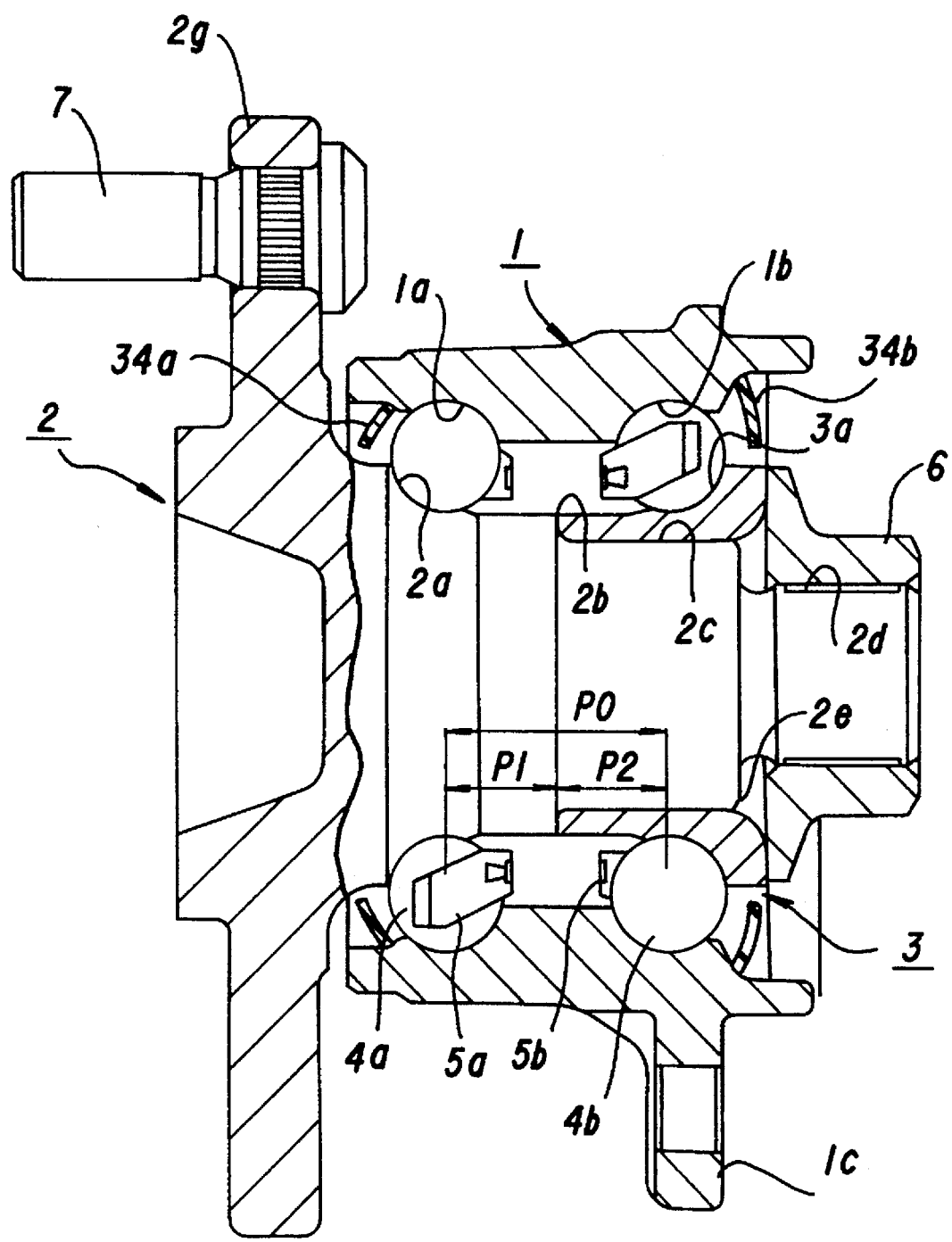
FIG. 1 is a sectional view showing an axle bearing assembly for according to an embodiment of the invention.

An axle bearing assembly shown in FIG. 1 is one in which a negative bearing clearance has been assured by using a bearing clearance measuring method according to the present invention to be later described. This bearing assembly comprises an outer ring 1 having two rows of raceway surfaces 1a and 1b formed on the inner periphery, an inner ring 3 having a raceway surface 3a formed on the outer periphery opposed to the raceway surface 1b of the outer ring 1, an axle 2 having a raceway surface 2a opposed to the raceway surface 1a of the outer ring 1 and a press-fit portion 2c continuous therewith through a shoulder portion 2b and adapted to have the inner ring 3 press-fitted thereon, two rows of balls 4a and 4b interposed between the outer ring 1 and the axle 2 and between the outer ring 1 and the inner ring 3, retainers 5a and 5b which retain the balls 4a and 4b, and a nut 6 threadedly fitted on the outer periphery of the end of the axle 2. Further, the outer periphery of the outer ring is integrally formed with a flange 1c adapted to be fixed to the body of an automobile or the like. The outer periphery of one end of the axle 2 is integrally peripherally formed with a flange 2g for mounting a hub bolt 7, while the outer periphery of the other end is provided with a threaded portion 2d for threaded engagement with the nut 6. The inner ring 3 is press-fitted on the press-fit portion 2c of the axle 2 and fixed in position by the nut 6 screwed on the threaded portion 2d of the axle 2.

Figure 14:
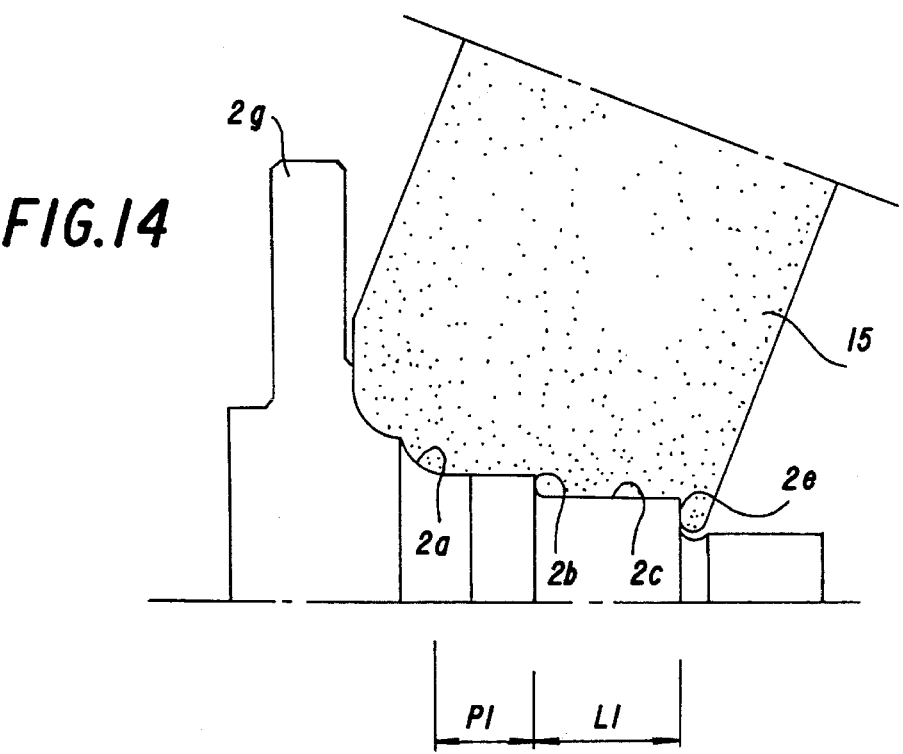
FIG. 14 is a view showing an axle manufacturing process.

In the first embodiment of the axle bearing assembly of the present invention, in the axle bearing assembly shown in FIG. 1, the end surface 2e of the press-fit portion 2c of the axle 2 is accurately processed to provide a reference surface (hereinafter referred to as the reference surface 2e) for measuring the negative bearing clearance present upon completion of the assembly, as will be later described. The reference surface 2e may preferably be ground simultaneously with the raceway surface 2a and shoulder portion 2b as by using a grinding stone 15 shown in FIG. 14. With this arrangement, the precision of the dimensions P1 and L1 (the axial dimension from the shoulder portion 2b to the reference surface 2e) can be secured. The differences of the axle bearing assembly of this embodiment from the conventional one shown in FIG. 15 reside in three points, that the inner ring 3 abuts against the shoulder portion 2b of the axle 2 with no clearance therebetween, that the reference surface 2e is provided for measuring the negative bearing clearance present upon completion of the assembly, and that the presence of the negative bearing clearance upon completion of the assembly is assured by using the reference surface 2c.

The bearing clearance, in the bearing processing, can be set to a desired negative bearing clearance by controlling and selectively combining the pitch P0 and groove diameter of the two rows of raceway surfaces 1a and 1b of the outer ring 1, the axial dimension P1 from the shoulder portion 2b of the raceway surface 2a of the axle 2 and the groove diameter, and the axial dimension P2 from the smaller end surface of the raceway surface 3a of the inner ring 3 and the groove diameter. Therefore, unlike the conventional axle bearing assembly, there is no need to control the bearing clearance by the tightening torque on the nut in the assembling process and the setting of the bearing clearance can be reliably made. Furthermore, there is no danger of causing a variation in the bearing clearance upon completion of the assembly. And the negative bearing clearance thus set to a desired value is measured by a measuring method to be described below and by assuring this, the reliability for the bearing life is greatly improved.

In the process for press-fitting inner ring 3, the axial bearing clearance (Δa) is measured in the order shown in FIGS. 2 through 6.

Figure 2:
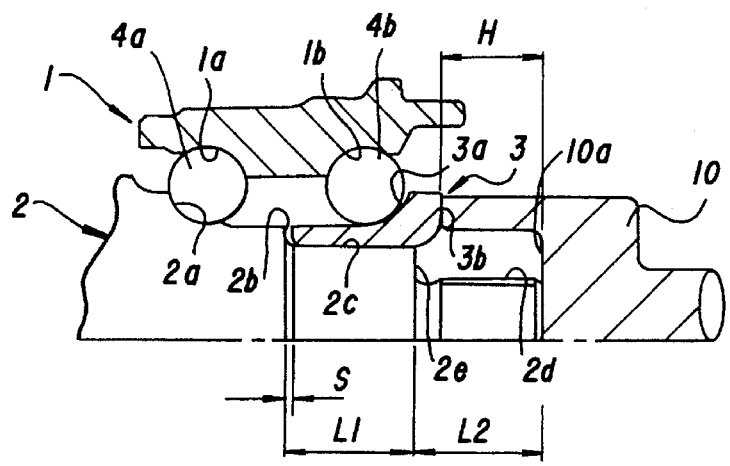
FIG. 2 is a sectional view showing one process in a first embodiment of the bearing clearance measuring method according to the invention.
Figure 3:
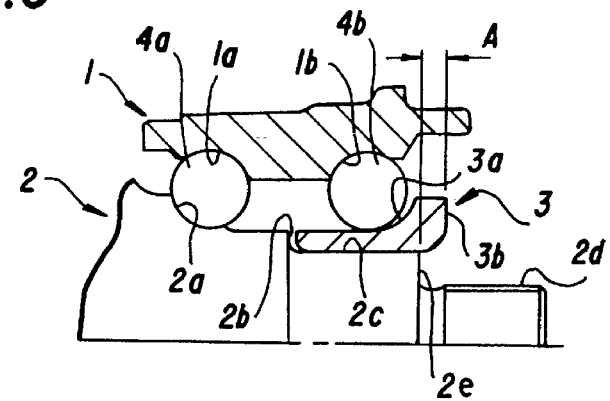
FIG. 3 is a sectional view showing one process in the first embodiment of the bearing clearance measuring method according to the invention.

First, as shown in FIG. 2, the inner ring 3 is press-fitted on the press-fit portion 2c of the axle 2 by using a press-fitting jig 10 having a recess (or pawl) 10a with a predetermined depth H. With the front end of the press-fitting jig 10 placed to abut against the larger diameter end surface (the back face) 3b of the inner ring 3, the inner ring 3 is pushed toward the shoulder portion 2b of the axle 2 until the bottom of the recess 10a of the press-fitting jig 10 abuts against the end of the axle 2, whereupon the inner ring 3 stops moving. Thereby, the press-fitting of the inner ring 3 is once stopped. At this point of time, the smaller diameter end surface (the front face) of the inner ring 3 is not abutting against the shoulder portion 2b, with a predetermined spacing S defined therebetween, and the axial bearing clearance is positive. Such state can be achieved by controlling the depth H of the press-fitting jig 10, the axial dimension L1 from the shoulder portion 2b of the axle 2 to the reference surface 2e for the press-fit portion 2c, the axial dimension L2 from the reference surface 2e to the axle end, and the width of the inner ring 3.

Figure 4:
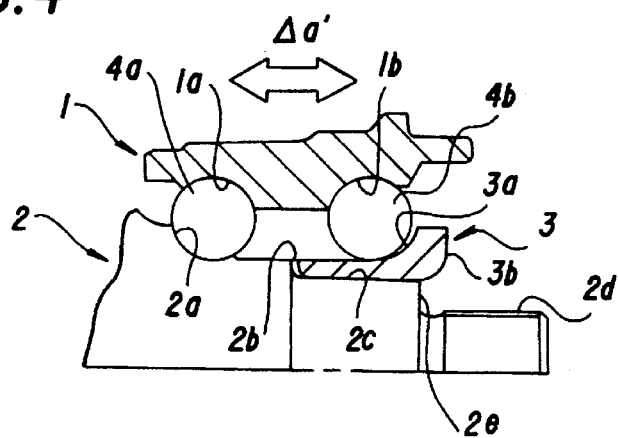
FIG. 4 is a sectional view showing one process in the first embodiment of the bearing clearance measuring method according to the invention.

Then, in this state, the axial dimension Δ from the back face 3b (which is the reference surface for the inner ring 3) of the inner ring 3 to the reference surface 2e for the axle 2 is measured (FIG. 3) and the axial bearing clearance Δa' is measured from the amount of axial movement of the outer ring 1 (FIG. 4).

Figure 5:
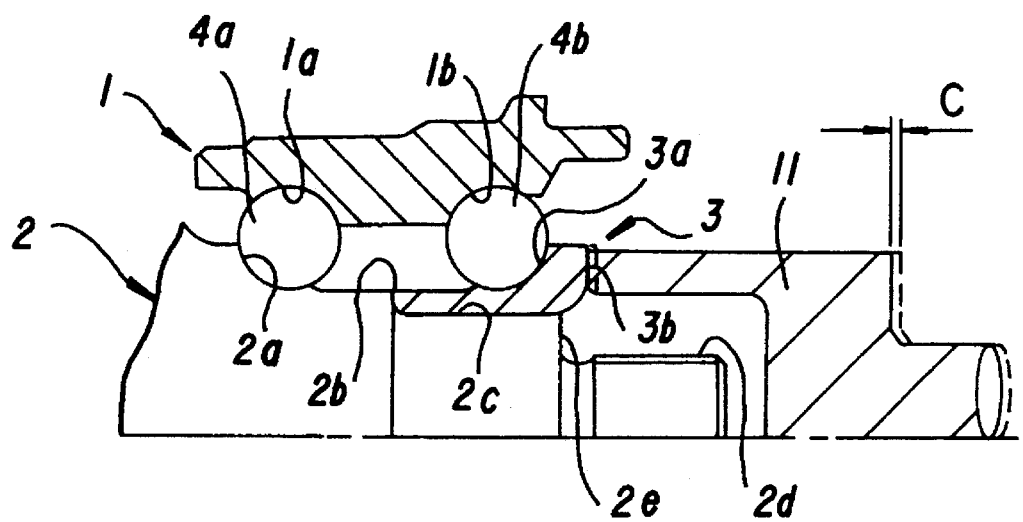
FIG. 5 is a sectional view showing one process in the first embodiment of the bearing clearance measuring method according to the invention.
Figure 6:
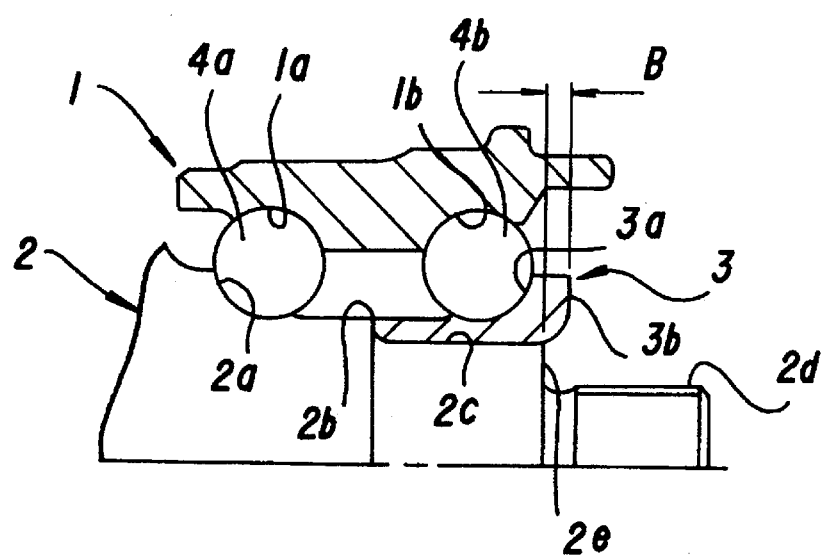
FIG. 6 is a sectional view showing one process in the first embodiment of the bearing clearance measuring method according to the invention.
Figure 7:
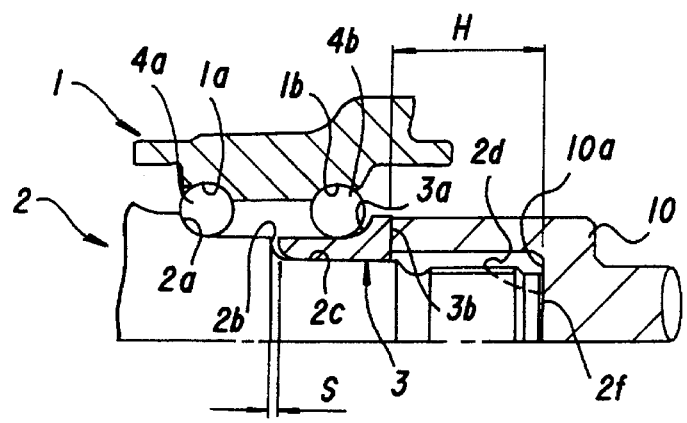
FIG. 7 is a sectional view showing one process in a second embodiment of the bearing clearance measuring method according to the invention.
Figure 8:
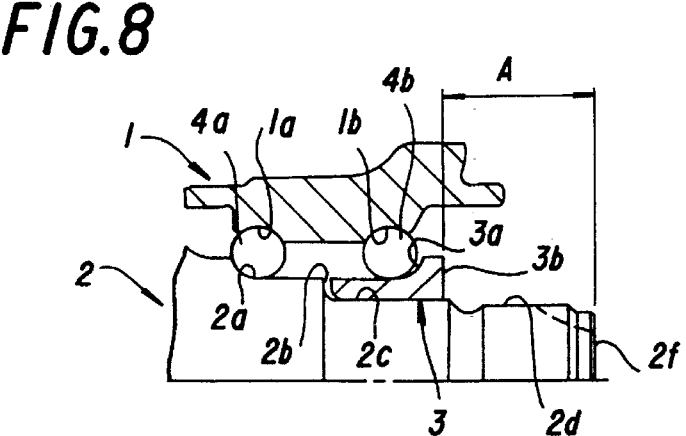
FIG. 8 is a sectional view showing one process in the second embodiment of the bearing clearance measuring method according to the invention.
Figure 9:
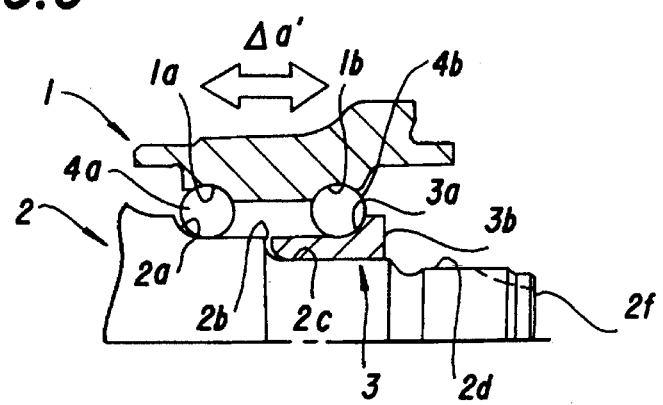
FIG. 9 is a sectional view showing one process in the second embodiment of the bearing clearance measuring method according to the invention.
Figure 10:
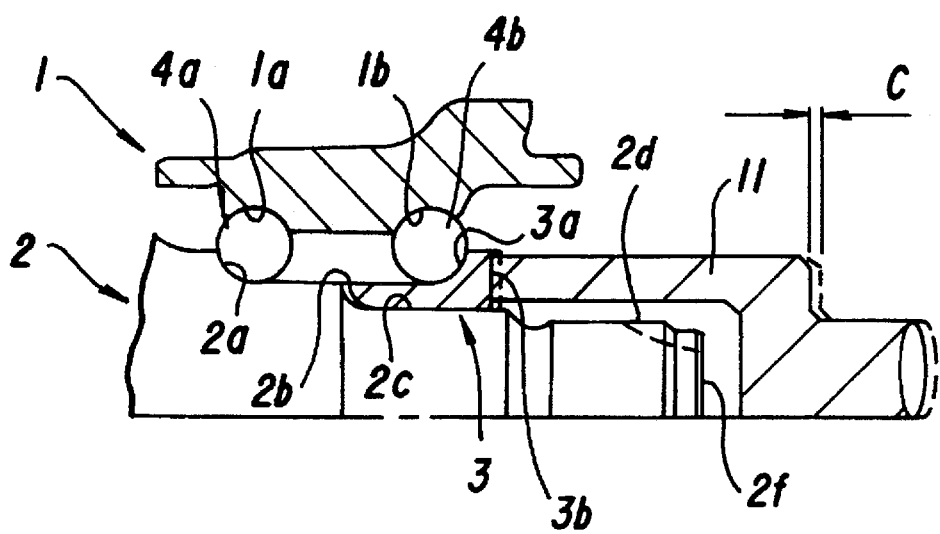
FIG. 10 is a sectional view showing one process in the second embodiment of the bearing clearance measuring method according to the invention.
Figure 11:
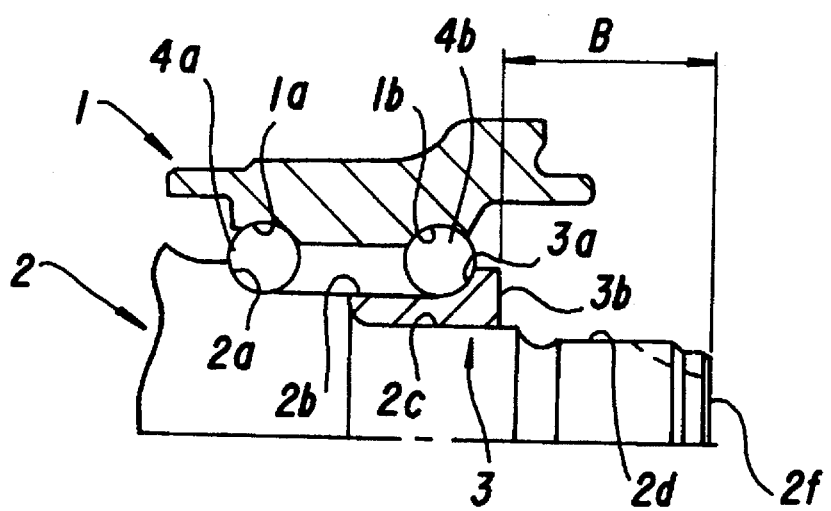
FIG. 11 is a sectional view showing one process in the second embodiment of the bearing clearance measuring method according to the invention.

Thereafter, as shown in FIG. 5, the inner ring 3 is press-fitted by using another press-fit jig 11 until it abuts against the shoulder portion 2b of the axle 2. And after the press-fitting has been completed, the axial dimension B between the back face 3b of the inner ring 3 and the reference surface 2e for the axle 2 is measured (FIG. 6). With the above operation thus completed, the negative axial bearing clearance Δ a can be found from Δa=Δa'−(A−B). Alternatively, as shown in FIG. 5, it is possible to measure the press-fitting stroke C of the inner ring 3 effected by the press-fitting jig 11 and find the negative axial bearing clearance Δa from Δa=Δa'−C.

The axial bearing clearance measuring methods described so far are used to make measurements by using the back face 3b of the inner ring 3 and the end surface 2e of the press-fit portion 2c of the axle 2 as reference surfaces; however, as shown in FIGS. 7–11, it is also possible to make measurements by using the back face 3b of the inner ring 3 and the end surface 2f of the axle 2 as reference surfaces.

Figure 15:
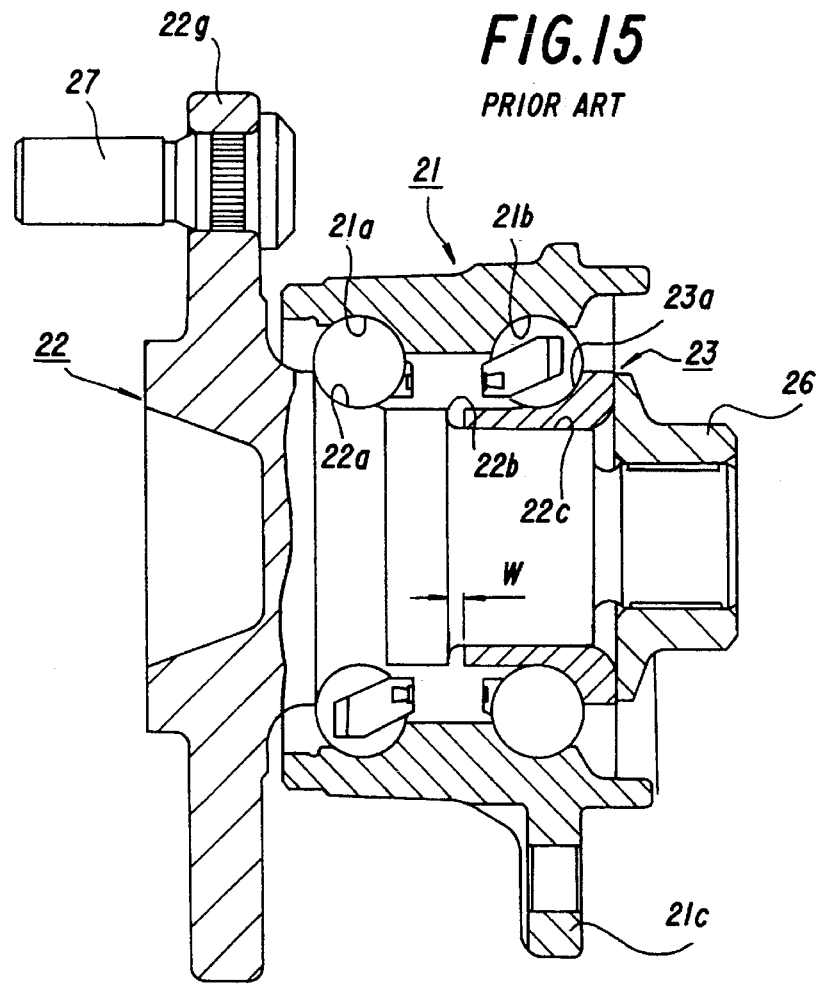
FIG. 15 is a sectional view showing a conventional axle bearing assembly.
Figure 16:
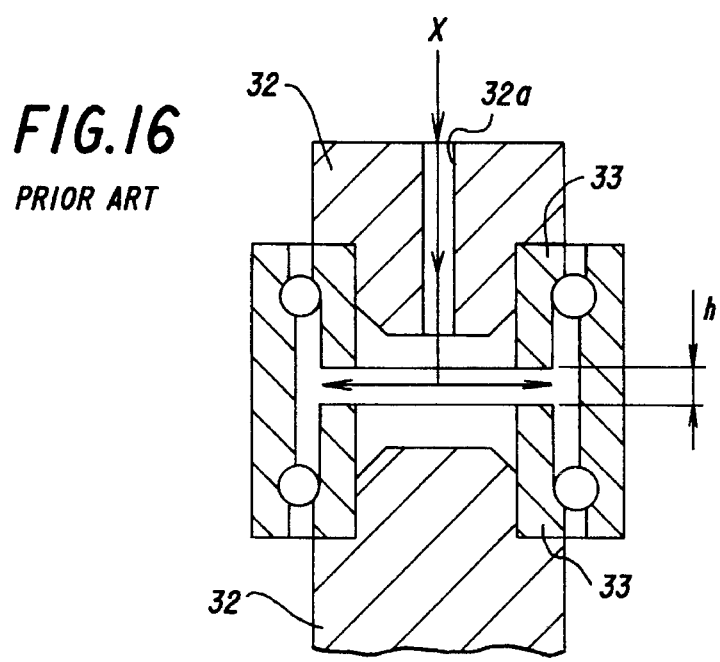
FIG. 16 is a sectional view showing a conventional example of a bearing clearance measuring method in a double row angular contact ball bearing having a pair of inner rings.

In addition, the bearing clearance measuring methods described above are each applicable to an axle bearing assembly of the type shown in FIG. 15 in which a spacing is defined between the inner ring and the shoulder portion of the axle (in this case, it is desirable to use a method which controls the press-fitting stroke). Further, they are also applicable to an axle bearing assembly of the type in which a pair of inner rings having raceway surfaces opposed to the two rows of raceway surfaces of the outer ring are fitted on the axle.

Figure 12:
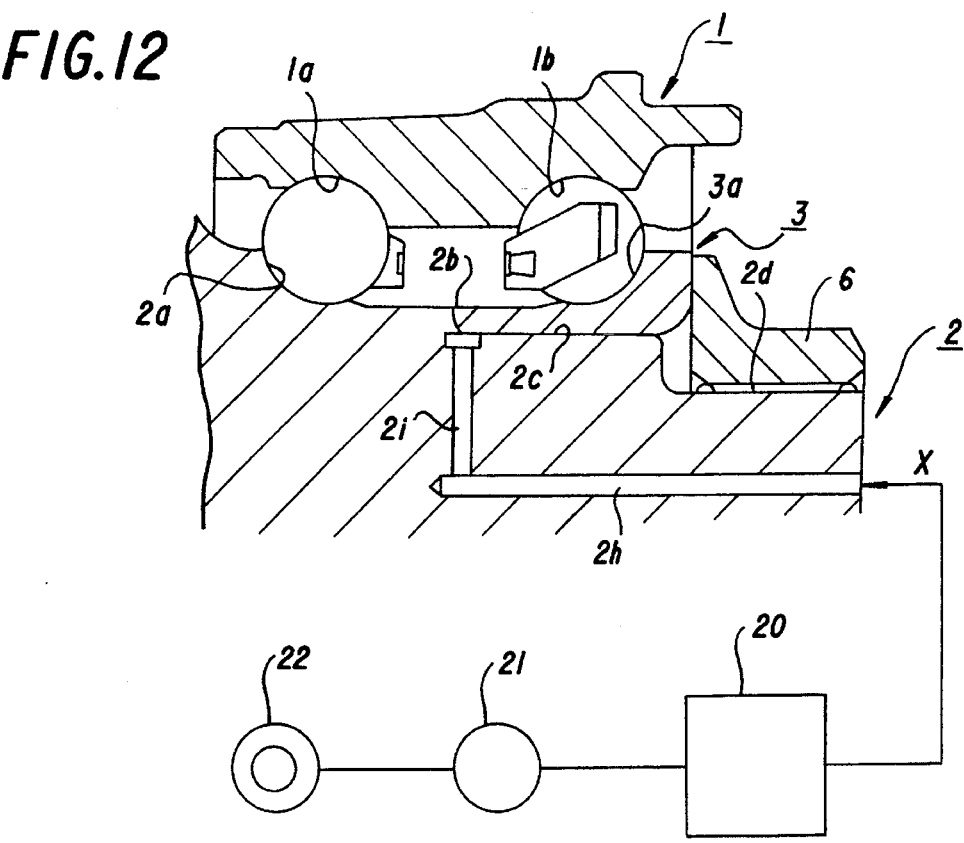
FIG. 12 is a fragmentary enlarged sectional view showing the third embodiment of the axle bearing assembly according to the invention.

In a second embodiment of the axle bearing assembly of the present invention, the axle 2 in the axle bearing assembly shown in FIG. 1 is provided with a single axial air passage 2h and a plurality of radial air passages 2i, as shown enlarged in FIG. 12. The axial air passages 2h extends along the axis of the axle 2 and opens at one end thereof to the outside. The plurality of radial air passages 21 extend radially of the axle 2 and each communicate at one end thereof with the other end of the axial air passage 2h and open at the other end thereof to the outside in the vicinity of the shoulder portion. When the bearing clearance is to be measured, the axial air passage 2h will have an compressed air source 22 connected to one end thereof through detector means 20, such as a pneumatic-to-electric transducer, and a regulator 21.

The bearing clearance, in the bearing processing, can be set to a desired negative bearing clearance by controlling and selectively combining the pitch P0 and groove diameter of the two rows of raceway surfaces 1a and 1b of the outer ring 1, the axial dimension P1 from the shoulder portion 2b of the raceway surface 2a of the axle 2 and the groove diameter, and the axial dimension P2 from the front face of the raceway surface 3a of the inner ring 3. Therefore, unlike the conventional assembly, there is no need to control the bearing clearance by the tightening torque on the nut during the assembling and the setting of the bearing clearance can be reliably made. Furthermore, there is no danger of causing a variation in the bearing clearance upon completion of the assembly. In addition, as for the axle 2, if the raceway surface 2a, shoulder portion 2b, press-fit portion 2c, and the end surface 2e of the press-fit portion 2c are simultaneously ground as by using a grinding stone 15 shown in FIG. 14, the precision of the dimensions P1 and L1 (the axial dimension from the shoulder portion 2b to the reference surface 2e) is secured, thereby facilitating said selective combination. And, the negative bearing clearance thus set to a desired value is measured by a measuring method to be described below, and by assuring this, the reliability for the bearing life and the like is greatly increased.

In the process of press-fitting the inner ring 3, the axial bearing clearance (Δa) is measured in the order shown in FIGS. 13A–13D.

Figure 13A:
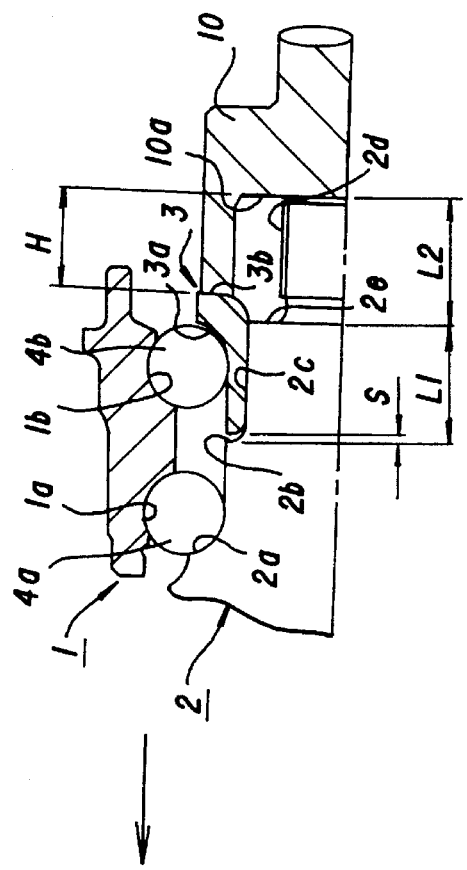
FIGS. 13A through 13D are sectional views showing a third embodiment of the present invention, illustrating a bearing clearance measuring method in the order of processing.

First, as shown in FIG. 13A, the inner ring 3 is press-fitted on the press-fit portion 2c of the axle 2 by using a press-fitting jig 10 having a recess (or pawl) 10a with a predetermined depth H. With the front end of the press-fitting jig 10 placed to abut against the back face 3b of the inner ring 3, the inner ring 3 is pushed toward the shoulder portion 2b of the axle 2 until the bottom of the recess 10a of the press-fitting jig 10 abuts against the end of the axle 2, whereupon the inner ring 3 stops moving. Thereby, the press-fitting of the inner ring 3 is once stopped. At this point, the front face of the inner ring 3 is not abutting against the shoulder portion 2b, with a predetermined spacing S defined therebetween, and the axial bearing clearance is positive. Such state can be achieved by controlling the depth H of the press-fitting jig 10, the axial dimension L1 from the shoulder portion 2b of the axle 2 to the reference surface 2e for the press-fit portion 2c, the axial dimension L2 from the end surface 2e to the axle end, and the width of the inner ring 3.

Figure 13D:
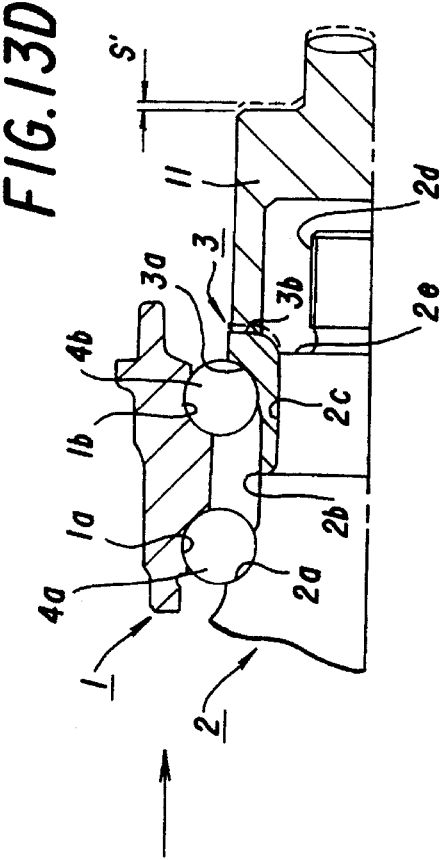
Figure 13B:
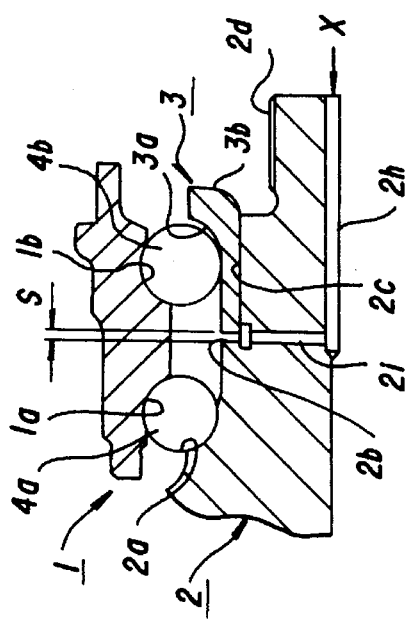
Figure 13C:
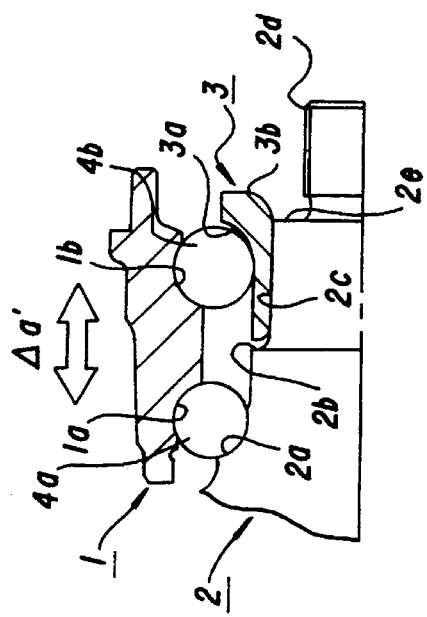

Then, in this state, compressed air X is fed from one end of the axial air passage 2h (FIG. 13B). At this time, the axial air passage 2h has a compressed air source 22 connected to one end thereof through detector means 20 and a regulator 21 in the manner shown in FIG. 12. The compressed air X from the compressed air source 22 is set to a given pressure value by the regulator 21, whereupon it is fed to the axial air passage 2h through the detector means 20 and then it is blown out of the spacing S through the radial air passage 21. Since the size of the spacing S is proportional to the back pressure, amount of flow and flow rate of the compressed air X, it is possible to find the size of the spacing S by detecting them by the detector means 20. After the spacing S has been found in this manner, the axial bearing clearance Δa' is measured from the amount of axial movement of the outer ring 1 (FIG. 13C).

Thereafter, as shown in FIG. 13D, the inner ring 3 is press-fitted on the shoulder portion 2b of the axle 2 until it abuts against the shoulder portion 2b of the axle 2 by using another press-fitting jig 11. The press-fitting stroke at this time is S' (=S). With the above operation thus completed, it is possible to find the negative axial bearing clearance Δa from Δa=Δa'−S.

In the above embodiment, the press-fitting jig 10 having the predetermined depth H has been used as means for once stopping the press-fitting of the inner ring 3 (FIG. 13A); however, as an alternative, it is possible to feed the compressed air X from the beginning of the press-fitting to thereby press-fit the inner ring 3 by a suitable jig while controlling the spacing S, and once stop the press-fitting of the inner ring 3 when the spacing S takes a desired value. Further, upon completion of the press-fitting of the inner ring 3, in this state a lubricant such as grease or the like may be sealed in the bearing.

Further, the bearing clearance measuring method in this embodiment is likewise applicable to an axle bearing of the type in which a pair of inner rings having raceway surfaces opposed to the two rows of raceway surfaces of an outer ring are fitted on an axle. Further, it is also applicable (by providing an air passage) to an axle bearing assembly of the type in which a spacing W is defined between the inner ring and the shoulder portion of the axle, as shown in FIG. 15. In this case, by finding the spacing W in the same manner upon completion of the press-fitting of the inner ring, as described above, it is possible to find the negative axial bearing clearance Δa from Δa=Δa'−(S−W).

In the bearing clearance measuring methods in the embodiments described above (the first bearing clearance measuring method shown in FIGS. 2 though 6, the second bearing clearance measuring method shown in FIGS. 7 though 11, and the third bearing clearance measuring method shown in FIGS. 12 through 13A–13D), a lubricant such as grease may be sealed in the bearing simultaneously with the bearing clearance measurement before or after the press-fitting of the inner ring 3. In this case, a lubricant may be fed to the bearing through the space between the outer and inner rings 1 and 3 or between the outer ring 1 and the axle 2 (from the end side) from a lubricant feeding line which has means for detecting the amount of lubricant, adjusting means for adjusting the delivery pressure and amount of delivery of lubricant, and a lubricant supply source. Alternatively, in the case of the embodiments shown in FIGS. 12 and 13A–13D, a lubricant may be fed to the bearing through the passages 2h and 2i after the measurement of the bearing clearance and before the press-fitting of the inner ring 3 (the process between FIGS. 13B and 13C or the process between FIGS. 13C and 13D). In addition, the connections between the detecting means, adjusting means and supply sources of the lubricant feeding line may be determined as required, preferably in accordance with the air feeding means shown in FIG. 12. Further, these assembles may be housed in a single box to be thereby made an integral feeding assembly.

The feeding of the lubricant may, of course, be effected separately from the bearing clearance measurement; however, by effecting it simultaneously with the bearing clearance measurement as described above, the axle bearing assembly can be inspected and assembled in a shorter time, thereby reducing the working time and equipment operating time, a fact which leads to a cost reduction.

Further, in order to protect the axle bearing assembly from extraneous substances, such as dust, dirt, mud, sand, and water, a seal may be installed between the outer ring 1 and the axle 2 and/or between the outer and inner rings 1 and 3 in the region which is outside the balls 4a and 4b. In FIG. 1, an arrangement is shown by way of example in which two seals 34a and 34b are installed. However, the seal configuration, the attaching construction and the like may be suitably selected according to the conditions for use and are not limited particularly to the arrangement shown in FIG. 1. The provision of seals protects the axle bearing assembly from extraneous substances such as dirt and the like and also protects the balls, raceway surfaces, retainers and the like from extraneous substances. In addition, the attachment of seals is effected after the sealing-in of the lubricant.

What is claimed is:

1. An axle bearing assembly comprising an outer ring having a flange formed on the outer periphery thereof and two rows of raceway surfaces formed on the inner periphery thereof, an inner ring having a raceway surface formed on the outer periphery thereof in opposed relation to one of the raceway surfaces of the outer ring, an axle formed on the outer periphery thereof with a raceway surface opposed to the other raceway surface of the outer ring and also with a press-fit portion continuous therewith through a shoulder portion and adapted to have the inner ring press-fitted thereon, and two rows of balls angularly contacting with one row of the raceway surfaces of the outer ring and the raceway surface of the inner ring and with the other row of the raceway surfaces of the outer ring and the raceway surface of the axle, wherein the inner ring is press-fitted until it abuts against the shoulder portion of the axle and in that bearing clearance is negative.

2. A method of measuring the bearing clearance in an axle bearing assembly which comprises an outer ring having a flange on the outer periphery thereof and two rows of raceway surfaces formed on the inner periphery thereof, an inner ring having a raceway surface formed on the outer periphery thereof in opposed relation to one of the raceway surfaces of the outer ring, an axle formed on the outer periphery thereof with a raceway surface opposed to the other raceway surface of the outer ring and also with a press-fit portion continuous therewith through a shoulder portion and adapted to have the inner ring press-fitted thereon, and two rows of balls angularly contacting with one row of the raceway surfaces of the outer ring and the raceway surface of the inner ring and with the other row of the raceway surfaces of the outer ring and the raceway surface of the axle, said method comprising, in press-fitting the inner ring on the press-fit portion of the axle, the steps of once stopping the press-fitting while the axial bearing clearance is positive, measuring in this state the axial dimension (A) between a reference surface for the axle and a reference surface for the inner ring and an axial bearing clearance ($\Delta a'$), continuing the press-fitting until completion, and measuring the axial dimension (B) between the reference surface for the axle and the reference surface for the inner ring, thereby finding the negative axial bearing clearance ($\Delta a$) upon completion of the assembly from $\Delta a = \Delta a' - (A - B)$.

3. A method of measuring the bearing clearance in an axle bearing assembly which comprises an outer ring having a flange formed on the outer periphery thereof and two rows of raceway surfaces formed on the inner periphery thereof, an inner ring having a raceway surface formed on the outer periphery thereof in opposed relation to one of the raceway surfaces of the outer ring, an axle formed on the outer periphery thereof with a raceway surface opposed to the other raceway surface of the outer ring and also with a press-fit portion continuous therewith through a shoulder portion and adapted to have the inner ring press-fitted thereon, and two rows of balls angularly contacting with one row of the raceway surfaces of the outer ring and the raceway surface of the inner ring and with the other row of the raceway surfaces of the outer ring and the raceway surface of the axle, said method comprising, in press-fitting the inner ring on the press-fit portion of the axle, the steps of once stopping the press-fitting while the axial bearing clearance is positive, measuring an axial bearing clearance ($\Delta a'$) in this state, and measuring the amount of press-fitting stroke (C) continuing from this state to the completion of the press-fitting of the inner ring, thereby finding the negative axial bearing clearance ($\Delta a$) upon completion of the assembly from $\Delta a = \Delta a' - C$.

4. A method of measuring the bearing clearance in an axle bearing assembly which comprises an outer ring having a flange formed on the outer periphery thereof and two rows of raceway surfaces formed on the inner periphery thereof, an inner ring having a raceway surface formed on the outer periphery thereof in opposed relation to one of the raceway surfaces of the outer ring, an axle formed on the outer periphery thereof with a raceway surface opposed to the other raceway surface of the outer ring and also with a press-fit portion continuous therewith through a shoulder portion and adapted to have the inner ring press-fitted thereon, and two rows of balls angularly contacting with one row of the raceway surfaces of the outer ring and the raceway surface of the inner ring and with the other row of the raceway surfaces of the outer ring and the raceway surface of the axle, said method comprising the steps of forming the axle with an air passage which opens to the outside in the vicinity of the shoulder portion, once stopping, in press-fitting the inner ring on the press-fit portion of the axle, the press-fitting while the axial bearing clearance is positive, finding the spacing (S) between the shoulder portion of the axle and the end surface of the inner ring opposed thereto from such detected values as the back pressure and the amount of flow or flow rate of compressed air blown out of the spacing (S) through the air passage, measuring the axial bearing clearance ($\Delta a'$) in this state, and press-fitting the inner ring until it abuts against the shoulder portion of the axle, thereby finding the negative axial bearing clearance ($\Delta a$) from $\Delta a = \Delta a' - S$.

* * * * *